United States Patent [19]
Coiro, Sr. et al.

[11] Patent Number: 5,148,766
[45] Date of Patent: Sep. 22, 1992

[54] VENTILATED RACK AND ANIMAL CAGE SYSTEM

[75] Inventors: Michael A. Coiro, Sr., Jacobstown; Dale R. Murray, Burlington Township, Burlington County; Philip A. Lastowski, Hamilton Square, all of N.J.

[73] Assignee: Allentown Caging Equipment Co., Inc., Allentown, N.J.

[21] Appl. No.: 806,146

[22] Filed: Dec. 12, 1991

[51] Int. Cl.⁵ ............................................. A01K 1/00
[52] U.S. Cl. ........................................ 119/17; 119/15
[58] Field of Search ............................. 119/15, 17, 19

[56] References Cited

U.S. PATENT DOCUMENTS

| | | | |
|---|---|---|---|
| Re. 32,113 | 4/1986 | Harr | 119/15 |
| 4,249,482 | 2/1981 | Harr | 119/17 |
| 4,343,261 | 8/1982 | Thomas | 119/15 |
| 4,365,590 | 12/1982 | Ruggieri et al. | 119/15 |
| 4,402,280 | 9/1983 | Thomas | 119/15 |
| 4,528,941 | 7/1985 | Spengler | 119/15 |
| 4,690,100 | 9/1987 | Thomas | 119/15 |
| 4,989,545 | 2/1991 | Scheaffer et al. | 119/15 |
| 5,000,120 | 3/1991 | Coiro, Sr. et al. | 119/15 |
| 5,048,459 | 9/1991 | Niki et al. | 119/17 |

Primary Examiner—John G. Weiss
Attorney, Agent, or Firm—Mathews, Woodbridge & Collins

[57] ABSTRACT

An animal cage rack includes a forced air system for removing air from the periphery of the animal cages. The rack includes "U" shape guides for positioning and aligning each cage with respect to a positive ventilating probe and an automatic watering device. Each cage includes a top bonnet section, a bottom section which supports the bonnet around the periphery thereof, a flat rim wire bar lid, and a filter in the bonnet. An L-shaped spacer separates the bonnet from the bottom section so that air exhaust ports in the U-shaped guide can remove exhausted air from the periphery of the cage. Positive air supplied by an air inlet manifold is introduced through an aperture in the bonnet and the L-shaped bracket, to the top of each cage. A downwardly facing port in the air tube forces air toward the bottom of the cage which after it circulates is removed through the periphery by the exhaust ports in the U-shaped cage guides.

18 Claims, 6 Drawing Sheets

VENTILATED RACK AND ANIMAL CAGE SYSTEM

BACKGROUND OF THE INVENTION

1. Field of the Invention

This invention relates to an animal cage system in which the cages are supported by a rack and air supplied to the animal cages is removed from the periphery of each cage.

2. Related Prior Art

Ventilated combination animal cage and rack devices are known the art. For example, U.S. Pat. Nos. 4,343,261 and 4,402,280 describe an animal caging system with plurality of cages suspended on flanges from a plurality of shelves. The ventilation system is entirely enclosed and is formed integrally with the caging system rack. Valves control air flow to and from the cages through the filter on top of the cages.

U.S. Pat. No. 4,690,100 describes a ventilated animal housing and service system with cage boxes suspended on brackets. Each cage is provided with a flat filter panel disposed across the open top of the cage.

U.S. Pat. No. 4,528,941 describes a modular assembly with a plurality of chambers or cages supported by a free-standing plenum. The plenum supplies and/or exhausts air to and from the cages. The cages sit on individual shelves and are connected to the plenum by air inlet and outlet tubes.

U.S. Pat. No. 4,365,590 describes a ventilated animal cage with open top ends and a rack formed of a hollow housing divided into a plurality of horizontally disposed shelf compartments. An air plenum extends vertically along one side of the cage rack and communicates with the shelf compartments. Low pressure negative air flow draws the air from the cage rack.

U.S. Pat. No. 4,989,545 describes a ventilated cage and rack system having a plurality of shelves which act as air plenums for conveying air to a plurality of predetermined air positions within the ventilated rack.

U.S. Pat. No. 5,000,120 describes a combination rack and cage including a forced air ventilation system which is coupled to the cage when placed on the rack. The air is directed down to the floor of the cage and circulates around towards the bonnet filter. Ventilation air passes out through the periphery of the open top under the skirt of the filter bonnet.

Other patent references of general interest include U.S. Pat. No. 4,249,482 and Re. 32,113.

SUMMARY OF THE INVENTION

Briefly described the invention comprises an animal rack and cage system in which forced high efficiency particulate air (HEPA) is introduced into the bonnet of each cage and removed from the periphery thereof. Each cage includes a top bonnet section, a bottom section which supports the bonnet around the periphery thereof, a wire bar lid having a flat circumferential rim seated between the top and bottom sections, and an air filter located in the top of the bonnet. The rack includes a plurality of "U" shaped guides having arms which position and align each cage and bonnet assembly properly with respect to a positive air probe and a conventional automatic watering device. The positive air probe is connected to a HEPA filter supply inlet manifold and is introduced into each cage through an aperture in the bonnet. Each ventilating probe includes a port which faces downwardly towards the bottom section of each cage. An L-shaped spacer bracket separates the top and bottom sections of each cage. The spacer brackets also include an aperture through which said air probe passes.

Each "U" shaped guide bracket includes a plurality of exhaust ports in the outer portion connected to a negative air exhaust manifold. When a cage is properly positioned in the "U" shaped guide assembly, the air exhaust ports are located adjacent to the periphery of the cage where the top and bottom sections have been separated by the spacer bracket. Air introduced into each cage through the port of the air probe circulates downwardly and then upwardly and is eventually exhausted through the periphery of the cage through the exhaust ports in the "U" shaped guide assembly. The arms of each "U" shaped guide assembly help to direct air especially from the sides of the cage towards the rear where the periphery is separated to its maximum extent.

These and other features of the invention can be further understood by reference to the following drawings

DETAILED DESCRIPTION OF THE INVENTION

During the course of this description like numbers will be used to identify like elements according to the different figures which illustrate the invention.

Figure 1A:
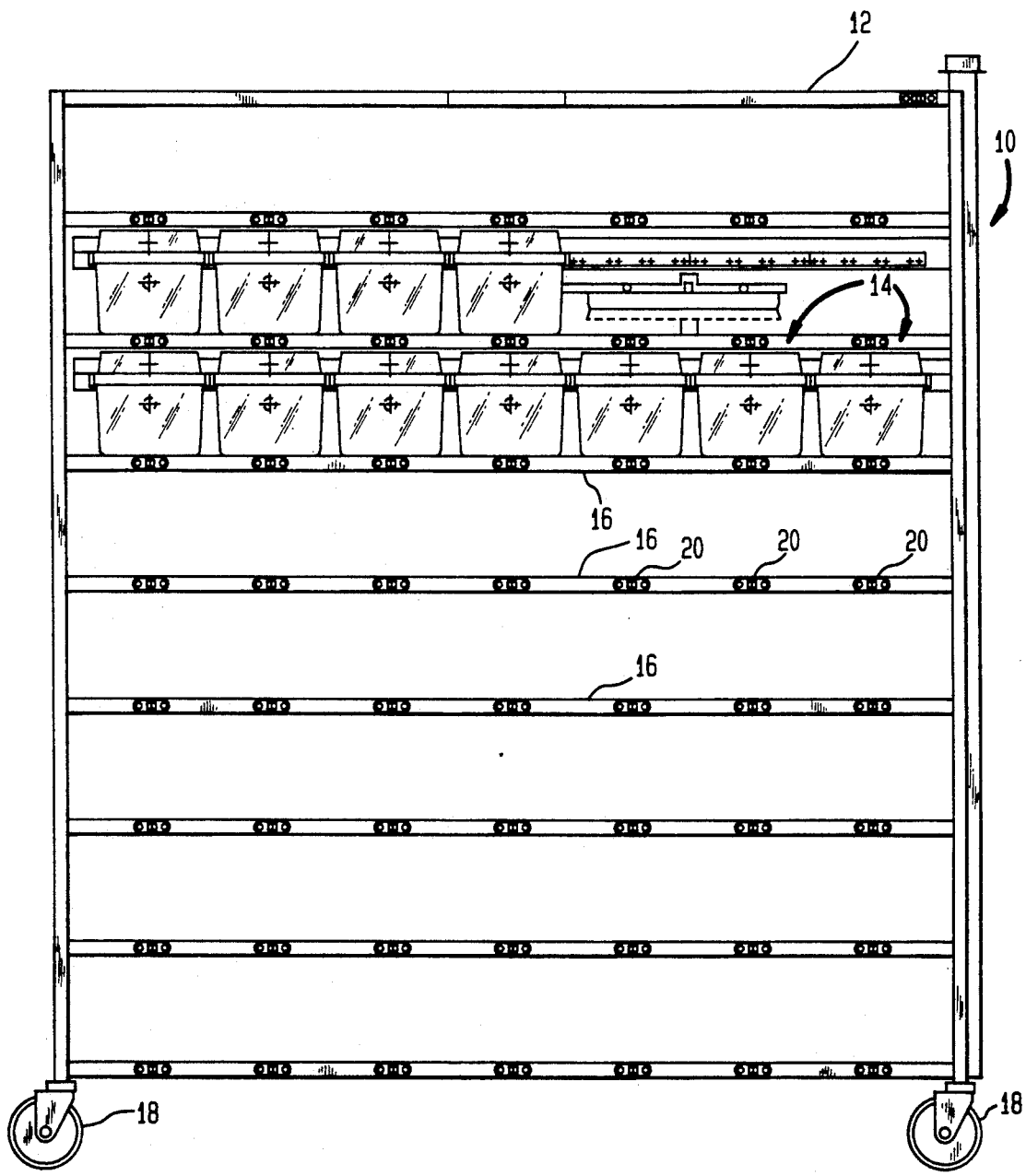
FIG. 1A is a front perspective view of the ventilated rack and cage system according to the preferred embodiment of the invention.

The ventilated rack and animal cage system 10 according to the preferred embodiment of the invention is seen from the front in FIG. 1A. The rack 12 comprises a frame which supports a plurality of individual animal cages 14. Animal cages 14 sit on shelves 16 which in turn communicate with air and water supply systems. Wheels 18 are attached to the bottom of the rack frame 12 and permit the assembly to be wheeled from location to location. Identification tags 20 are located directly below each individual animal cage.

The ventilated rack and animal cage system 10 illustrated in FIG. 1A has eight shelves 16 located on the rack 12. Each shelf 16 can accommodate seven cages 14. Accordingly, the invention 10 can accommodate fifty-six animal cages 14 on the front side and another fifty-six animal cages 14 on the back side for a total of 112. The size of the rack 12 and the number of cages 14 that it can accommodate can be varied according to the needs of the user.

Figure 1B:
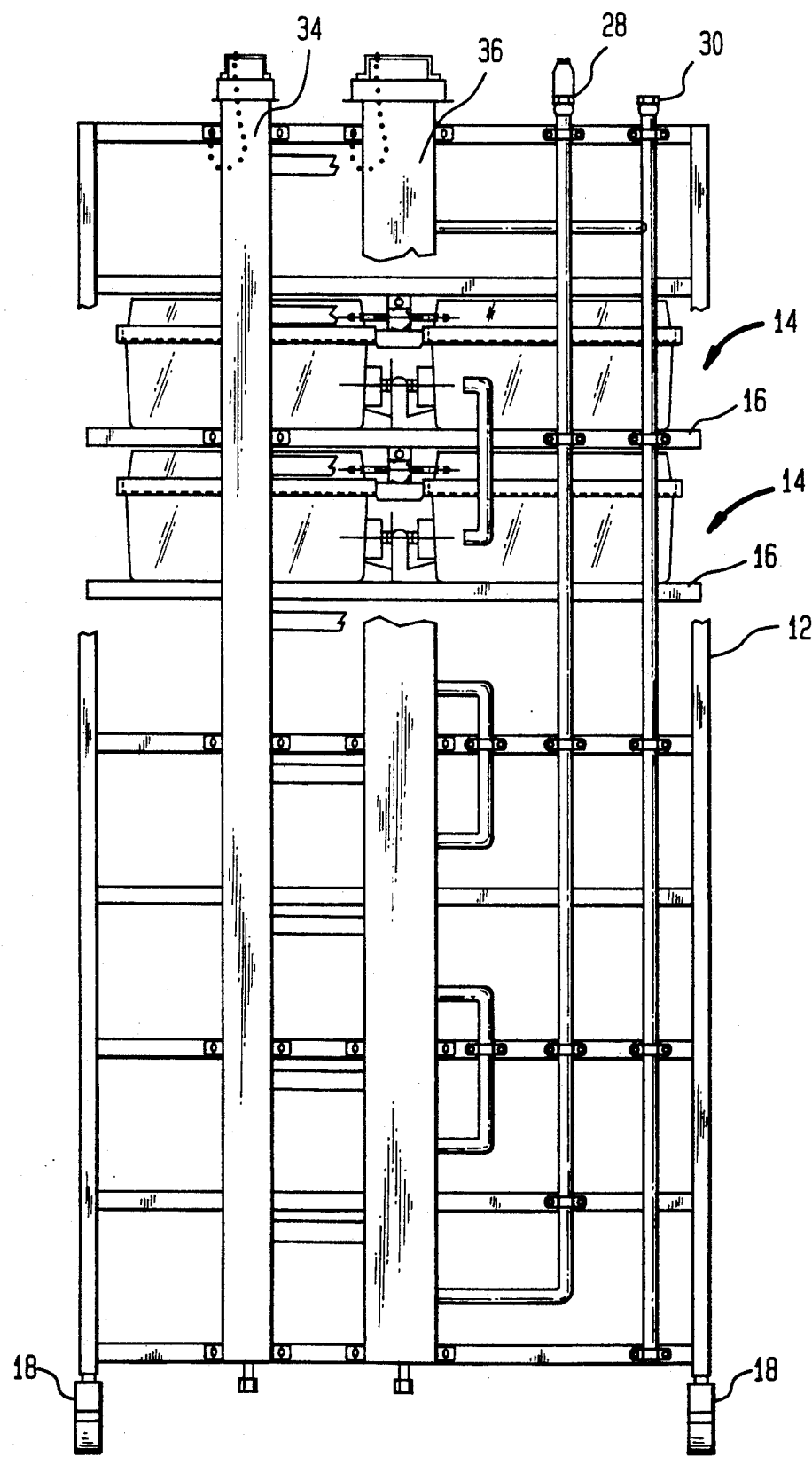
FIG. 1B is a side elevational view of the rack and animal cage system illustrated in FIG. 1A showing the location of the positive vertical air plenum, the negative vertical air plenum, and the water inlet and outlet supply piping.
Figure 4A:
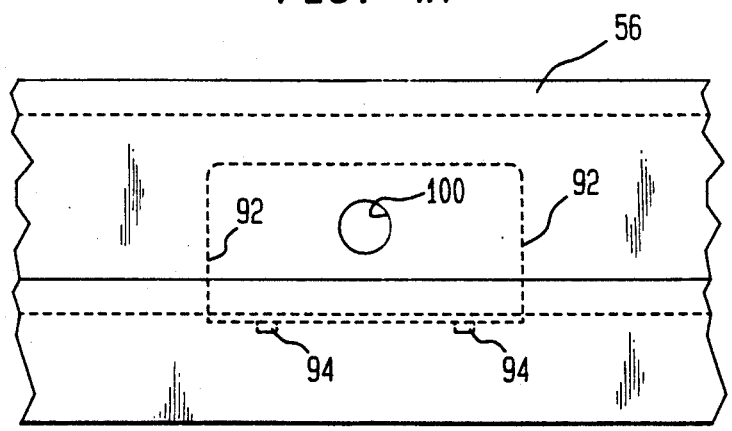
FIG. 4A is a detailed, front elevational view illustrating the spacer bracket and its relationship to the bonnet of the animal cage.
Figure 4B:
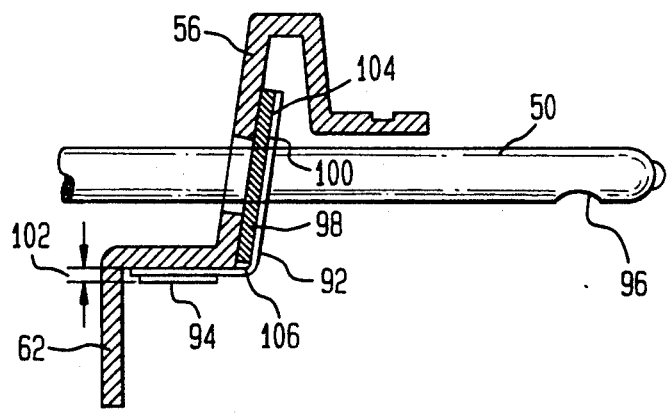
FIG. 4B is a side, elevational, cross-sectional view of the spacer bracket illustrated in FIG. 4A in the context of the air probe assembly.
Figure 4C:
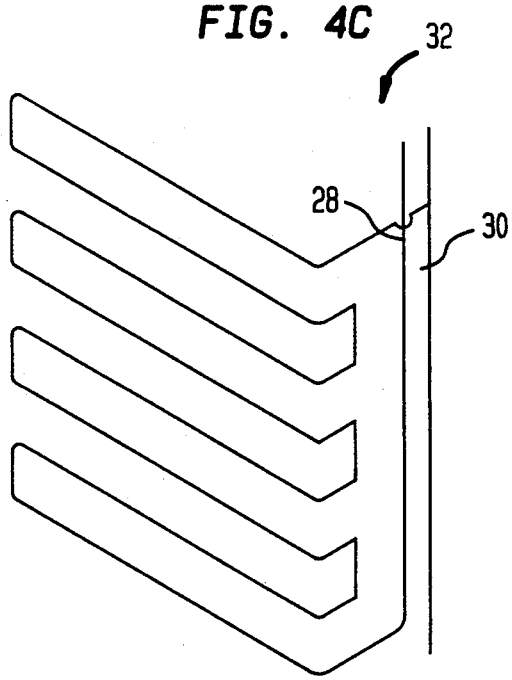
FIG. 4C illustrates the water distribution system of the invention.

Fresh water is supplied to the system 10 through water inlet line 28 shown in the side elevational view of FIG. 1B. The water is supplied from shelf 16 to shelf 16 in a switch-back like fashion as illustrated in FIG. 4C and eventually is exhausted through a water drain line 30.

Figure 2:
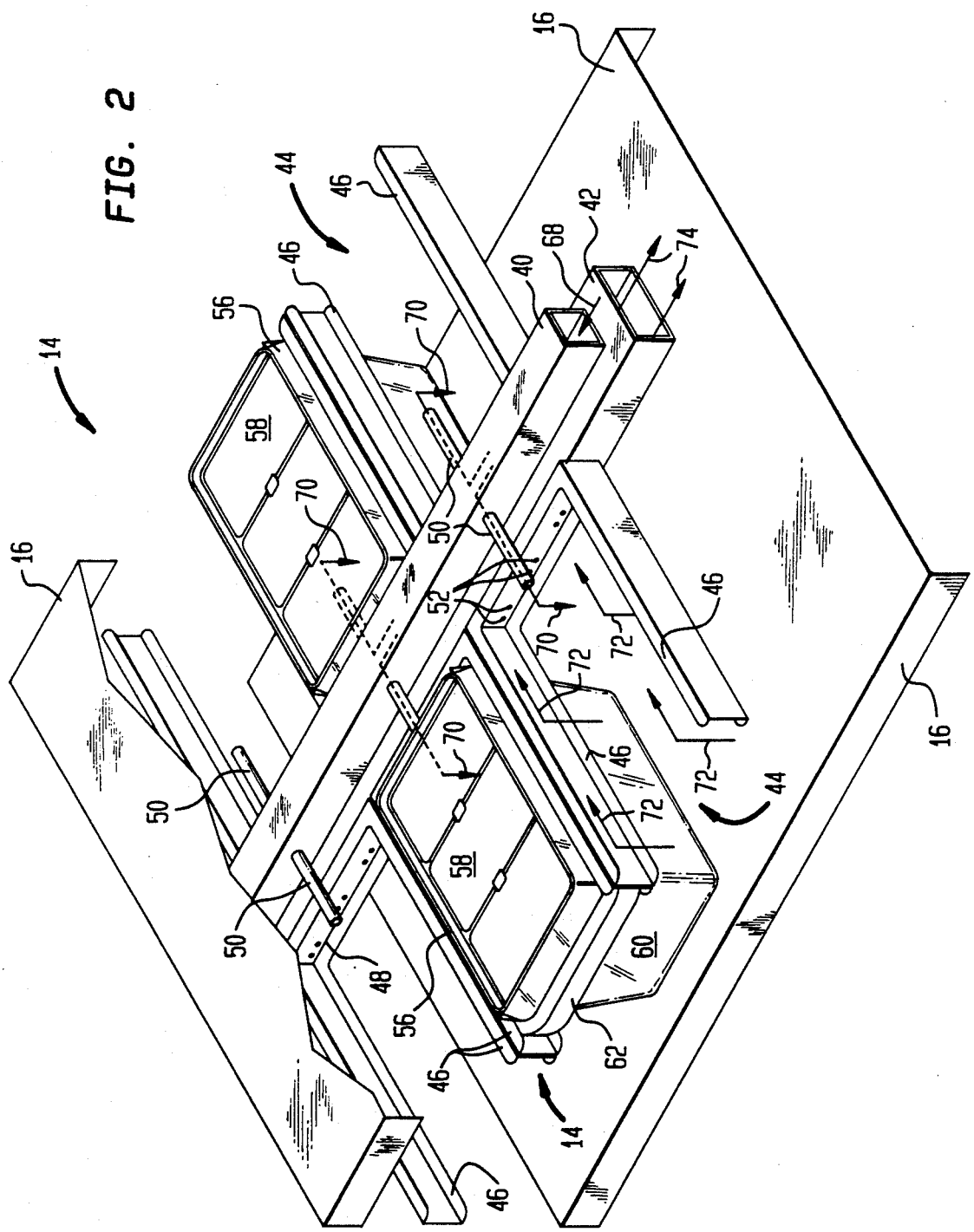
FIG. 2 is a perspective, cross-sectional view of the preferred embodiment of the invention illustrating the manner in which individual cages are received by the "U" shaped guide assemblies and positioned adjacent to the positive air probe and exhaust ports.

High efficiency particulate air (HEPA) is introduced into the system 10 through the positive vertical plenum 34. A plurality of air inlet manifolds 40, such as seen in FIG. 2, receive the positive pressure air from the positive vertical plenum 34 and uniformly distribute it to the cages 14. Expelled cage air is returned through an air exhaust manifold 42 to the negative vertical plenum 36 after which the air is treated by the laboratory exhaust system or portable HEPA filtered exhaust unit and eventually released to the atmosphere.

Cages 14 are aligned and properly positioned with respect to the positive HEPA air supply tubes 50 and by the water supply system valve 84 and by "U" shaped cage guide assemblies 44. Each "U" shaped guide assembly 44 includes a pair of arms 46 which surround the cage on the sides 62 and a rear portion 48 which includes a plurality of exhaust ports 52 that communicate with air exhaust manifold 42.

Cages 14 are generally similar to those described in U.S. Pat. No. 5,000,120. A typical cage 14 includes a top section or bonnet 56 which is supported around its periphery 62 by a flat rimmed wire bar lid 90 where rim is supported by a bottom section or cage bottom 60. A filter 58 is attached to the top of bonnet 56.

Positive incoming HEPA filtered air flows in the direction of arrow 68 through the air inlet manifold 40 and through air supply tubes or probes 50 into each cage 14 in the direction of arrow 70. After circulating around each cage 14 the exhausted air returns in the direction of arrow 72 down the side of the arms 46 of the "U" shaped guide assemblies 44 and escapes through a gap 102 in the periphery 62, through the exhaust ports 52, and into the exhaust manifold 42 under the influence of negative air pressure in the direction of arrows 74. As previously described the exhausted air then travels out of the negative vertical plenum 36 to the laboratory air treatment system or portable HEPA filtered exhaust unit and released.

Figure 3A:
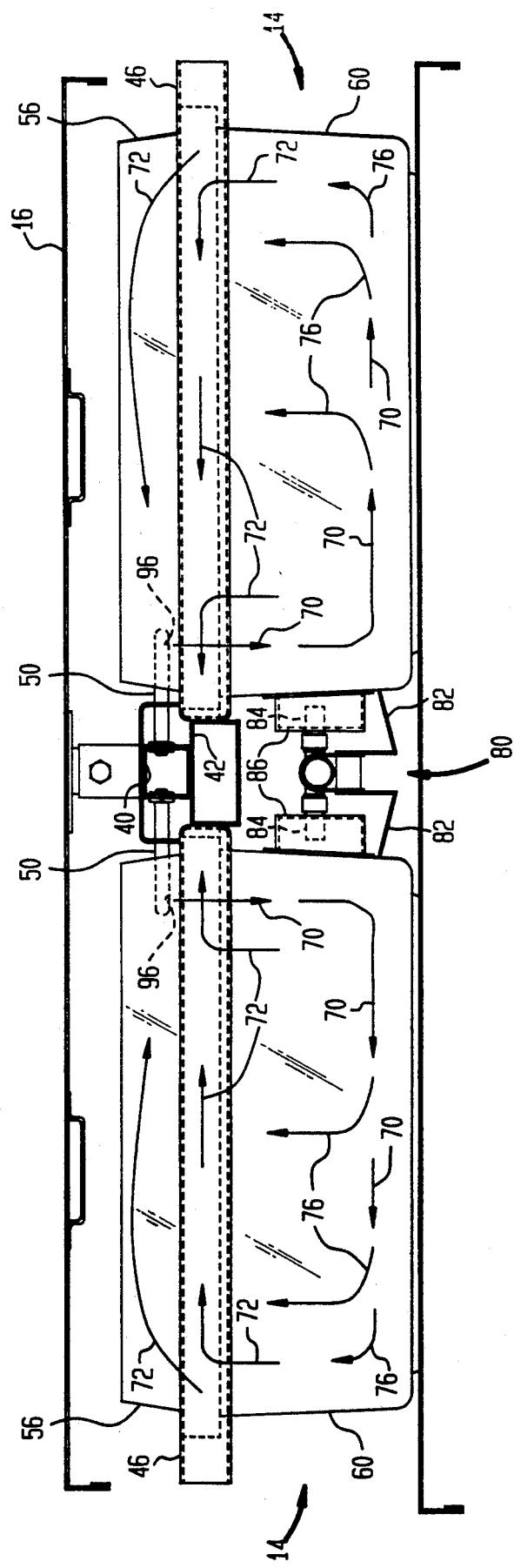
FIG. 3A is a cross-sectional detailed view of the rack system illustrated in FIG. 2 showing the manner in which air circulates through individual cages in the front and back of the rack.
Figure 3B:
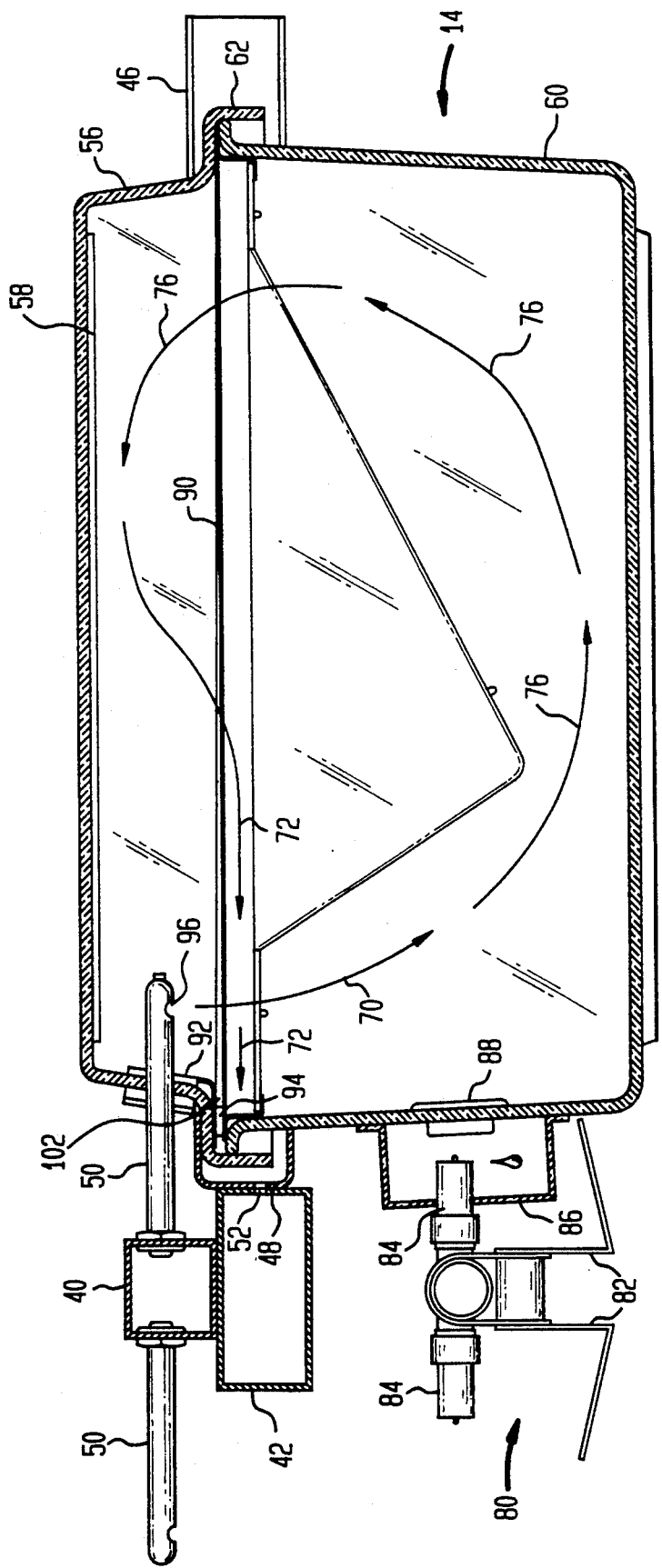
FIG. 3B is a more detailed cross-sectional illustration of a single individual cage such as seen in FIG. 3A.

Details of the air supply and circulation system of the present invention 10 are illustrated in further detail in FIGS. 3A and 3B. FIG. 3A is a cross-sectional view of the invention 10 illustrating the fact that the cages 14 located on the front and back side of the rack 12 are serviced in a symmetrical fashion by the circulating air and water supply systems. FIG. 3B is a detailed view of one side of the air and water supply system illustrated in FIG. 3A. HEPA filtered air exits the air probe 50 through a port 96 in the direction of arrow 70. Port 96 directs the air 70 towards the floor or bottom of the cage 14. This forces the vapors that normally settle to the bottom of the cage to circulate vertically in the direction of arrow 76 so that some of the gases and vapors escape through the filter 58 in the bonnet 56. The majority of the gases, vapors and particulate matters, however, pass freely out of the cage 14 through a gap 102 in the periphery 62 that permits the air to circulate in the direction of arrow 72 down the arms 46 of the "U" shaped guide assembly 44 and through the exhaust ports 52 under the influence of a negative pressure in the air plenum 42.

Water is supplied to each cage 14 by a water supply system 80 supported by a bracket 82. A conventional automatic watering valve 84 is connected to the water inlet line 28 such as illustrated in FIG. 4C. Each cage 14 is equipped with a sealed cup 86 and a diaphragm 88 that permits the animal in the cage 14 to access the automatic watering valve 84 while maintaining a sterile cage environment.

In order to ensure that there is a gap 102 between the bonnet 56 and the bottom 60 of each cage 14, an "L" shaped bracket 92 is positioned therebetween. As shown in FIGS. 3B, 4A and 4B, the "L" shaped bracket 92 preferably rides on the flat rim of the wire bar lid 90 that is located at the rear of the cage 14 between the bonnet 56 and the cage bottom 60.

FIGS. 4A and 4B illustrate details of the "L" shaped spacer bracket 92. Spacer bracket 92 includes an upper or first section 104 connected to a lower or second section 106. Upper section 104 is set at an angle of approximately 80° with respect to second section 106 so as to mimic the contour of the inside of the periphery of bonnet 56. An aperture or hole 100 is located in the upper or first section 104 of spacer bracket 92 and is positioned to accommodate the air tube or probe 50 shown in FIGS. 3B and 4B. A silicone grommet 98 sandwiched between the upper section 104 and the interior of the bonnet 56 helps to seal the aperture 100 in order to prevent contaminated air from entering from the inside of the cage 14.

A pair of elevation protrusions or spacers 94 are formed into the bottom surface of the lower or second section 106 of the spacer brackets 92. Protrusions 94 rest on the flat rim of the wire bar lid 90 which in turn rests on the upper surface of the cage bottom 60. Protrusions 94 in combination with the thickness of the lower section 106 produce a gap 102 preferably no greater than 1/16th of an inch between the lip of the bonnet 56 and the flat wire bar lid 90. This permits the air from the positively pressurized cage 14 to escape from the periphery 62 and into the exhaust ports 52 which are aligned adjacent to the periphery 62 by the "U" shaped guide assemblies 44. The spacer bracket 92 produces the gap 102 only near exhaust ports 52. The gap 102 tapers down and becomes substantially zero at the end of the cage 14 furthest removed from spacer bracket 92.

In summary, positive HEPA filtered air is supplied through plenum 34 and into the air inlet manifold 40 associated with each shelf 16. Each level is fed by the common positive vertical plenum 34 and sealed to ensure proper air balance from shelf 16 to shelf 16. Positive air from air inlet manifold 40 is forced through the port 96 of each air tube or probe 50 downwardly towards the floor of each cage bottom 60 in the direction of arrow 70. The air circulates in the direction of arrow 76 and the majority of the gases, vapors and particulate matter are withdrawn from the cage 14 in the direction of arrows 72 through the gap 102 formed by spacer bracket 92 between the bonnet 56 and the flat wire rim of cage lid 90. In the process a minimal amount of gas and vapor escapes through the filter 58 in the bonnet 56 in the conventional fashion. Exhaust ports 52 located near the periphery 62 adjacent the gap 102 draw the air into the air exhaust manifold 42. Air in exhaust manifold 42 is in turn withdrawn by the negative vertical plenum 36 and transported to a suitable laboratory treatment system or portable HEPA filtered exhaust unit where it is treated and eventually released.

While the invention has been described with reference to the preferred embodiment thereof, it will be appreciated by those of ordinary skill in the art that modifications can be made to the structure and form of the invention without departing from the spirit and scope thereof.

What is claimed:

1. An animal cage system comprising:
   at least one cage having a top section and a bottom section that supports said top section at a periphery;
   a rack for supporting said cage; and,
   an air supply means including an air input means for supplying air to said cage and an air removal means for removing air from the periphery of said cage; and
   a spacer bracket located between said top and bottom sections of said cage for separating said top and bottom sections to allow air to be removed from said periphery to an exhaust port after said air has circulated through said cage.

2. The system of claim 1 wherein said air input means comprises:
   a positive air inlet manifold; and,
   an air tube connected to said positive air inlet manifold,
   wherein said air tube supplies air to said cage through an aperture in the top section thereof.

3. The system of claim 2 wherein said air tube includes a port therein which points in the direction of said bottom section of said cage so tat air supplied to said cage is directed towards the bottom of said cage.

4. The system of claim 3 wherein said air removal means comprises:
   a negative pressure air exhaust manifold.

5. The system of claim 1 wherein said air input means comprises:
   a positive air inlet manifold; and,
   an air tube connected to said positive air inlet manifold,
   wherein said air tube supplies air to said cage through an aperture in the top section thereof.

6. The system of claim 5 wherein said air tube includes a port therein which points in the direction of said bottom section of said cage so that air supplied to said cage is directed towards the bottom of said cage.

7. The system of claim 6 wherein said air removal means comprises:
   a negative pressure air exhaust manifold; and,
   at least one air exhaust port located near the periphery of said cage,
   wherein air is removed from said cage by said air exhaust port after said air has circulated through said cage.

8. An animal cage apparatus for use in a rack having an air supply and an air exhaust manifold, said apparatus comprising:
   a top section means for receiving air from said air supply manifold;
   a bottom section means for supporting said top section means at the periphery thereof; and
   a spacer means for spacing said top and bottom section means apart so that air can be removed from said periphery by said air exhaust manifold.

9. The apparatus of claim 8 wherein said spacer means comprises a bracket having a top portion and a bottom portion and a generally L-shape.

10. The apparatus of claim 9 wherein the bottom portion of said spacer bracket is locatable at the periphery between the top and bottom section means at the rear of said cage and includes projections thereon to assist in separating the top and bottom section means.

11. An animal cage system comprising:
    at least one cage having a top section and a bottom section that supports said top section at a periphery, said top section having an aperture therein;
    a rack for supporting said cage;
    an air supply means including an air input means for supplying air to said cage and an air removal means for removing exhaust air from the periphery of said cage;
    said air input means including a positive air inlet manifold and an air tube connected to said positive air inlet manifold, said air tube supplying air to said cage through said aperture in said top section and said air tube including a port therein which points in the direction of said bottom section of said cage so that air supplied to said cage is direction towards the bottom of said cage.
    said air removal means including a negative pressure air exhaust manifold and at least one air exhaust port located near the periphery of said cage, so that said exhaust air is removed from said cage by said exhaust port after said air has circulated through said cage; and
    a spacer bracket located between said top and bottom sections of said cage for separating said top and bottom sections to allow said exhaust air to pass from said periphery to said exhaust port, said spacer bracket having a top section and a bottom section and a generally L-shape,
    wherein said top section of said bracket includes an aperture through which said air tube passes when said cage is located in said rack.

12. The system of claim 17 wherein said bottom portion of said spacer bracket is locatable at the periphery between said top and bottom sections of said cage and includes projections thereon to further separate said top and bottom sections.

13. The system of claim 12 further comprising:
    an "U"-shaped assembly including at least a pair of guide arms for guiding said cage into said rack and for assisting in the removal of air from the periphery of said cage.

14. The system of claim 13 further comprising:
    a wire bar lid having a relatively flat circumferential rim,
    wherein said flat rim is supported by the bottom section of said cage and said projections on said spacer bracket are supported by said flat rim so as to create a gap between said cage bottom and said cage top.

15. The system of claim 14 further comprising:
    a grommet having an aperture therein for receiving said air tube,
    wherein said grommet is locatable between the top section of said spacer bracket and said top section of said cage and seals air circulating within said cage from the exterior of said cage.

16. An animal cage apparatus for use in a rack having an air supply and an air exhaust manifold, said apparatus comprising:

a top section means for receiving air from said air supply manifold;

a bottom section means for supporting said top section means at the periphery thereof said cage having a front and rear section; and, a spacer means for spacing said top and bottom section means apart so that air can be removed from said periphery by said air exhaust manifold, said spacer means including a bracket having a top portion and a bottom portion and a generally L-shape, said bottom portion of said spacer bracket locatable at the periphery between said top and bottom section means at said rear section of said cage and including projections thereon to assist in separating said top and bottom section means, wherein the top portion of said spacer bracket includes an aperture therethrough through which air from said air supply means passes.

17. The apparatus of claim 16 further comprising:

a wire bar lid having a relatively flat circumferential rim, wherein said flat rim is supported by the bottom section of said cage and said projection on said spacer bracket are supported by said flat rim so as to create a gap between said cage bottom and said cage top.

18. The apparatus of claim 17 further comprising:

a grommet having an aperture therein, wherein said grommet is located between the top portion of said bracket and the top section means of said animal cage and further wherein said air from said air supply means passes through said aperture in said grommet.

* * * * *